United States Patent [19]
Gough et al.

[11] Patent Number: 4,481,154
[45] Date of Patent: Nov. 6, 1984

[54] INSERT FOR PLACEMENT IN A VESSEL AND METHOD OF FORMING THE INSERT

[75] Inventors: Martin J. Gough, Birmingham; John V. Rogers, Solihull, both of England

[73] Assignee: Cal Gavin Limited, Birmingham, England

[21] Appl. No.: 359,050

[22] Filed: Mar. 17, 1982

[30] Foreign Application Priority Data

Mar. 20, 1981 [GB] United Kingdom ............. 8108867

[51] Int. Cl.³ .............................................. B01F 3/04
[52] U.S. Cl. ................................... 261/94; 29/157 R; 55/233; 210/150; 261/DIG. 72; 264/299; 422/312
[58] Field of Search .................. 261/94–98, 261/DIG. 72; 264/299; 202/158; 210/150; 55/90, 233; 29/505, 157 R; 422/310, 312

[56] References Cited

U.S. PATENT DOCUMENTS 2,332,110 10/1943 Podbielniak ................ 261/DIG. 72
3,243,170 3/1966 Ellis et al. .................. 261/DIG. 72
3,438,614 4/1969 Lipinski ...................... 261/DIG. 72
3,589,687 6/1971 Leybourne ................. 261/DIG. 72
4,201,736 5/1980 Ellis et al. .................. 261/DIG. 72
4,333,893 6/1982 Clyde ......................... 261/DIG. 72

FOREIGN PATENT DOCUMENTS 482642 4/1938 United Kingdom .
483642 4/1938 United Kingdom .
1570530 7/1980 United Kingdom .

Primary Examiner—Richard L. Chiesa
Attorney, Agent, or Firm—Pearne, Gordon, Sessions, McCoy, Granger & Tilberry

[57] ABSTRACT

A method of making an insert comprising an elongate core having a plurality of loops disposed longitudinally therealong and angularly thereabout by taking such an insert wherein a portion of each loop lies in close proximity to a first conceptual enveloping surface and deforming the loops or displacing the loops so as to be inclined to the longitudinal axis of the core so that a greater proportion of each loop periphery is in close proximity to a second conceptual surface of smaller cross-section than said first surface. Also disclosed are inserts made in the above way and vessels incorporating such inserts.

15 Claims, 15 Drawing Figures

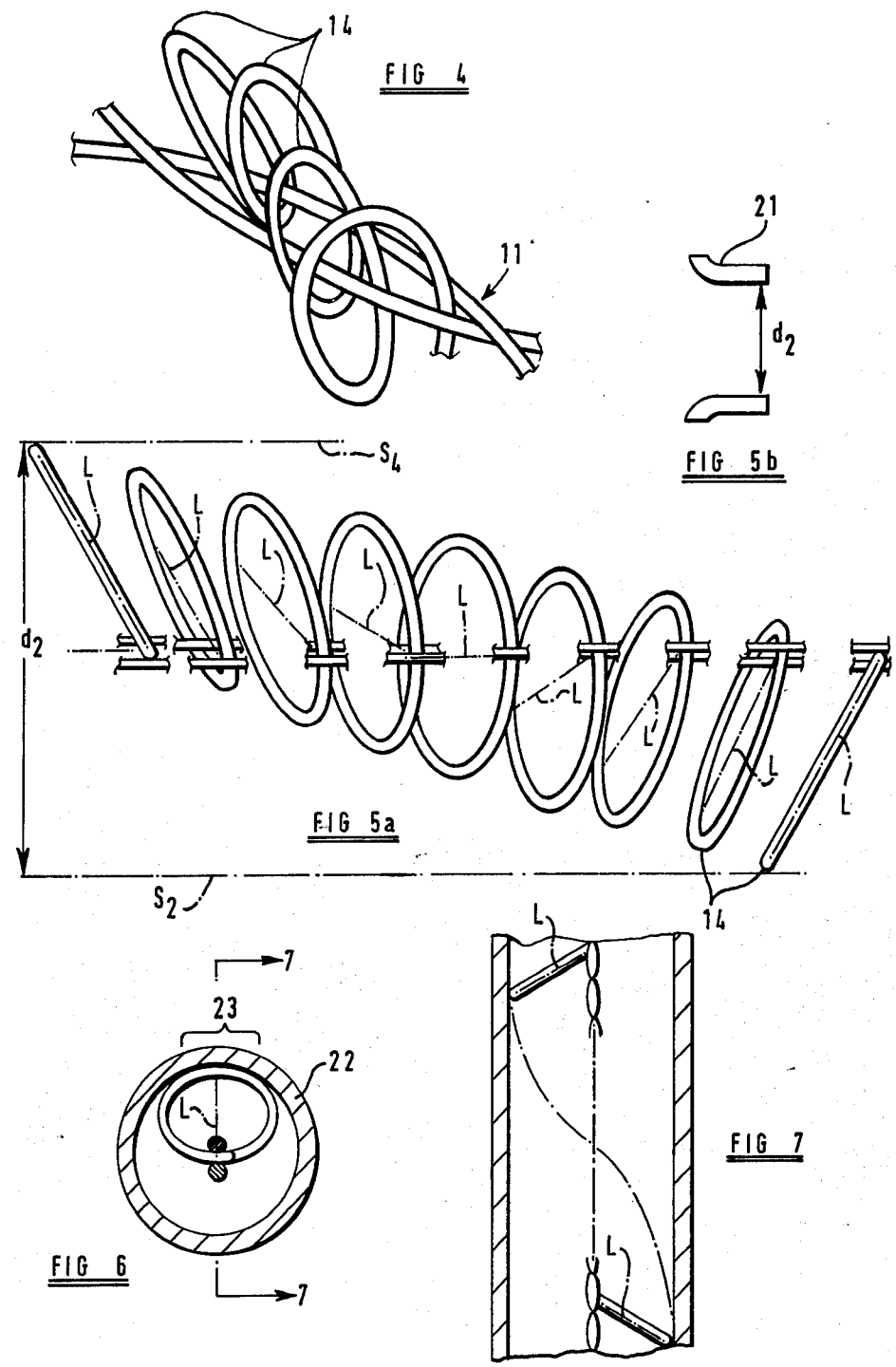

INSERT FOR PLACEMENT IN A VESSEL AND METHOD OF FORMING THE INSERT

BACKGROUND OF THE INVENTION

1. Field of the Invention

This invention relates to an insert, hereinafter referred to as the kind described, for placement within a vessel such as a tube to contact fluid therein.

Where the tube is a heat exchange tube for heating or cooling a fluid flowing through the tube the insert improves the efficiency of the heat transfer. For example, in the case of cooling a first fluid flowing through a tube by a second fluid on the outside of the tube the heat flux is given by:

$$Q = A h T \qquad (I)$$

where
- Q = heat flux
- A = area of the inside of the tube wall
- h = film coefficient of the rate of heat transfer from the first fluid to the wall.
- T = temperature difference between the first fluid and the wall (log mean T)

The film coefficient h is influenced by a number of factors:

(1) The turbulence of the first fluid both at the wall of the tube and within the tube away from the wall (2) The turbulence of the first fluid around the insert.

(3) The additional turbulence of the first fluid at the wall by the baffle action of the insert in contact with the wall.

(4) The nature of the material of construction of the insert and the rate of heat transfer by conduction along the insert to the wall.

(5) The rate of heat transfer across the junction at the point of contact of the insert with the wall. If unsoldered, with a micro film of fluid between the point of contact of the insert with the wall, the ability to conduct heat away from that transferred from the first fluid to the insert is less than when soldered. Soldering apart from eliminating the fluid film also marginally increases the area of contact with the wall thus creating an improved path for heat conduction.

(6) The more effective the conduction in transferring heat along the insert to the wall the lower the temperature of the insert and thus the greater the T between the first fluid and the insert surface. This improves the heat flux to the insert.

Where the vessel is a fluid treatment apparatus such as a fluid-fluid or fluid-solid contacting, de-entraining or physical and/or chemical reactor vessel, tube, column, tower or the like, an insert or a plurality of inserts of the type described is or are provided to improve, for example, one or more of the following; mixing, separation or distribution of fluids, mixing separation or distribution of a fluid and a solid, increasing the rate of diffusion or permeation in tubes used for reverse osmosis and permeation de-humidification coalescence and the like.

The above uses of an insert of the type described are given by way of example and explanation only and are not to be regarded as in any way limiting of the scope of the protection to be afforded by this patent since an insert of the type described and embodying the present invention may have other uses.

DESCRIPTION OF THE PRIOR ART

One example of an insert of the type described is the insert disclosed in GB PS No. 483642, where the insert is for placement in a radiator tube for an internal combustion engine so as to improve the efficiency of cooling of the fluid in the radiator tube.

Another example of an insert of the type described is that disclosed in GB PS No. 1570530, where the insert is for placement in a fluid-fluid or fluid-solid contacting, de-entrainment or reaction apparatus so as to improve interaction between fluids, or a fluid and a solid.

SUMMARY OF THE INVENTION

An object of the invention is to provide a new and improved method of making an insert of the kind described, another object is to provide a new and improved tube or other vessel for fluid having at least one insert of the kind described therein, and another object is to provide a new and improved insert of the kind described.

According to one aspect of the invention, we provide a method of making an insert of the kind described comprising the steps of taking an insert comprising an elongate core having a plurality of loops disposed longitudinally therealong and angularly thereabout wherein a portion of each loop lies in close proximity to a first conceptual enveloping surface so that laterally rectilinear lines extending from the core to a mid point of the portion of a respective loop in close proximity to said first surface are disposed at different longitudinal positions along the core and at different angular orientations around the core, and acting on said loops to cause a portion thereof to lie in close proximity to a second conceptual enveloping surface of smaller cross-section than said first conceptual surface so that the portion in close proximity to said second conceptual surface is a greater proportion of the loop perimeter than that which was in close proximity to the first conceptual surface.

By close proximity we mean that the distance between a loop portion and the surface lies in the range from zero and the lesser of the thickness of the filament of the loop and 2 mm and preferably 1 mm.

Herein, by laterally rectilinear, we mean that the line is rectilinear when viewed in a direction normal to a surface containing the loop, and by longitudinally rectilinear, we mean that the line is rectilinear when viewed along a direction line intersecting said line at right angles and intersecting opposite sides of the loop, and by longitudinally curved, we mean that the line is curved when viewed along said direction line.

According to another aspect of the invention, we provide a method of making a tube or other vessel comprising an elongate tubular portion having disposed therein an insert of the kind described comprising taking an insert comprising an elongate core having a plurality of loops disposed longitudinally therealong and angularly thereabout wherein a portion of each loop lies in close proximity to a first conceptual surface of a cross-sectional configuration greater than that of said tubular portion, so that laterally rectilinear lines extending from the core to the mid point of the portion of a respective loop in close proximity to said first surface are disposed at different longitudinal positions along the core and at different angular orientations around the core, and acting on said loops to cause a portion thereof to lie in close proximity to a second conceptual surface having a cross-sectional configuration substantially equal to that of the tubular portion, so that the portion in close proximity to said second conceptual surface is a greater proportion of the loop perimeter than that which was in close proximity to the first conceptual surface.

Preferably the insert is acted upon prior to insertion into the tubular portion.

The insert may be removably inserted into the tubular portion or it may be bonded therein by a metal bonding operation such as soldering, brazing or the like or by other means such as an adhesive or a resin.

Said loops may be acted upon by being deformed from a first configuration which they have when said part is in close proximity to said first surface to a second configuration which they have when said part is in close proximity to said second surface.

Said loops may lie in the same loop surface after deformation as before deformation and said loop surface may be substantially parallel to a diametral plane of the core. By substantially parallel we mean within ±15° and preferably ±10° of parallel.

Alternatively said loops may be acted upon by being caused to be moved from lying in a loop surface which is substantially parallel to a diametral plane of the core when in close proximity to said first conceptual surface to lie in a loop surface inclined to the longitudinal axis of the core and with said laterally rectilinear line of each loop and the axis of the core lying in a plane containing the core and extending radially therefrom, when lying in close proximity to said second conceptual surface.

The shape of each loop may be the same after being caused to lie in said inclined loop surface as before.

Alternatively, said loops may be acted upon by being caused to move from lying in a loop surface which is substantially parallel to a diametral plane of the core when in close proximity to said first conceptual surface to lie in a curved loop surface with said laterally rectilinear line of each loop being longitudinally curved and lines intersecting said line at right angles and passing through the sides of the loop being rectilinear and with said laterally rectilinear line of each loop and the axis of the core lying in a plane containing the core and extending radially therefrom, when lying in close proximity to said second conceptual surface.

Further alternatively said loops may be acted upon by being deformed from a first configuration and moved from lying in a loop surface or substantially parallel to a diametral plane of the core, when in close proximity to said first conceptual surface to a second configuration and so as to lie in a loop surface inclined to the longitudinal axis of the core and with said laterally rectilinear line of each loop and the axis of the core lying in a plane containing the core and extending radially therefrom when in close proximity to said second conceptual surface.

Further alternatively the loops may be acted upon by being deformed from a first configuration and moved from lying in a loop surface substantially parallel to a diametral plane of the core, when in close proximity to said first conceptual surface to a second configuration so as to lie in a curved loop surface with said laterally rectilinear line of each loop being longitudinally curved and lines intersecting said line at right angles and passing through opposite portions of the loop being rectilinear and with said laterally rectilinear line of each loop and the axis of the core lying in a plane containing the core and extending radially therefrom, when lying in close proximity to said second conceptual surface.

The loops may be deformed by acting upon the loops with a pair of reciprocable dies having a surface which, when the dies are close, define said second conceptual surface.

The loops may be caused to lie in said inclined loop surfaces by passing the insert through a die the surface of which lies in said second conceptual surface.

The core may comprise at least two elongate elements, the method comprising positioning a first core element within and extending through convolutions of a helical coil of filamentary material, positioning the second core element outside the helical coil, and then twisting the core elements together so that turns of the helical coil are caused to extend in a generally helical configuration about the core.

The core elements may be twisted together to provide sufficient turns to ensure that the loops lie substantially parallel to a diametral plane of the core. For example from 40 to 60 turns per foot for a core of about 0.060" diameter and a loop wire diameter of up to 0.036" and there may be not more than 8 loops, and preferably 5, trapped between the core elements over the length of each helical pitch.

The first conceptual surface may be from 15% to 100% larger than the second conceptual surface and is typically 48-50% larger.

Inserts described in said GB PS No. 483642 and GB PS No. 157530 have loop members which are of the same shape and with the same orientation to the core that they attain when only influenced by the twisting action of the core wires. This practice does not result in the shapes now described and with the substantially improved performance now gained.

According to a third aspect of the invention, we provide an insert of the kind described comprising an elongate core having a plurality of loops of filamentary material disposed longitudinally therealong and angularly thereabout, wherein a portion of each loop has been acted on to be moved from a first conceptual enveloping surface to a second conceptual enveloping surface of smaller cross section than said first conceptual surface so that laterally rectilinear lines extending from the core to a mid point of the portion of a respective loop in close proximity to said second conceptual surface are disposed at different longitudinal positions along the core and different angular orientations around the core, and wherein each line of each loop lies in a loop surface inclined to the longitudinal axis of the core at an acute angle when said line is longitudinally rectilinear or said line being longitudinally curved and said line of the loop and said axis of the core lying in a plane containing the core and extending radially therefrom.

Said lines may lie in a helical surface centered on the core.

Each loop may be generally circular.

Each loop may comprise at least one turn of a helical coil.

The core may comprise two elongate elements twisted together and a part of each of said loops being held between the twisted together elements.

The core elements may be relatively stronger than the loops.

The core element and/or loops may be made of multi or single filament material.

The core elements and/or loops may be made of metal wire.

The core elements and/or loops may be made from material of any suitable cross-section material including non-circular cross-sectional filament.

The loops may be made of material which is of zig-zag configuration the oscillations lying in a surface parallel to said core.

According to another aspect of the invention we provide a vessel comprising an elongate tubular portion having disposed therein an insert according to the third aspect of the invention or made according to the first aspect of the invention.

An insert made by the method embodying the present invention when used in a heat transfer application improves the mechanism of heat transfer in several ways. By virtue of the deformation in respect of the loops, a substantially increased portion of the loop is in close proximity to the wall of the tube compared with the substantially point contact obtained with inserts hitherto known from GB PS No. 483642 and GB PS No. 1570530. This is of course the case both where the insert is removable or bonded in position.

The greater area of close proximity improves heat conduction and the rate of heat transfer and also increases the baffling action and the turbulence of the fluid near the wall of the tube thus further adding to the rate of heat transfer. In the case where the first conceptual surface is substantially larger than the second conceptual surface and the loops are caused to lie in inclined planes when in close proximity to with said second conceptual surface then adjacent loops may overlap at the wall of the tube thereby increasing the baffling action and hence the turbulence in the fluid yet further.

The length of wire loop in close proximity with the tube wall and its particular shape and orientation act as an efficient influence in disrupting the relatively slow moving or even stagnant fluid that forms a boundary layer adjacent to the wall of the tube. This surface interruption at or near to the wall of the tube forces fluid to change direction from its natural course of flow and mix with other fluid at a greater distance from the tube wall.

The resulting effect of mixing taking place throughout the cross-section of the tube is to increase the temperature difference between: (a) the fluid and the tube wall; (b) the fluid and the insert surface when it is acting as a conductive path, particularly when the insert is bonded to the tube wall with a conductive material.

This increased temperature difference permits more heat to be transferred through the wall of the tube and thus the overall rate of heat transfer is considerably increased.

Thus the insert of the present invention gives an improved rate of heat transfer from the fluid to the wall of the tubular portion and increases the transfer of heat by conduction along the material of the insert as a result increases the difference in temperature between the insert and the first fluid compared with the previously known inserts.

Furthermore because an insert of the type described promotes turbulence in the fluid there is a tendency for an increase in pressure drop in the fluid in the tube and it is obviously desirable that the pressure drop is minimised. The pressure drop is a function of the quantity of loop filament present because the pressure drop is cause by frictional resistance to the fluid passing over the insert.

The insert of the present invention achieves this objective by using the material of its construction in a more effective way. Thus for a given heat transfer performance, less material is needed than hitherto and hence less pressure drop is incurred.

The fluid with which the invention is used may comprise a gas, liquid, liquid incorporating solids or mixtures thereof.

Particularly in the case of a fluid-fluid, or fluid-solid contacting, de-entrainment or physical and/or chemical reaction vessel tube, column, tower or the like, a plurality of inserts embodying the present invention and of relatively short length may be placed within the vessel. The nature of the surface of the inserts is such that when such inserts are placed in side by side contact there is little or no tendency for the loops of adjacent inserts to inter-mesh.

BRIEF DESCRIPTION OF THE DRAWINGS

Examples of the invention will now be described in more detail with reference to the accompanying drawings wherein:

FIG. 4 is a perspective view of part of another insert embodying the invention, FIG. 5a is a diagrammatic view showing a stage in the method of making the insert shown in FIG. 4, FIG. 5b is a diagrammatic view showing a drawing die for use in the stage shown in FIG. 5a;

FIG. 6 is a diagrammatic transverse cross-sectional view showing the insert of FIG. 4 engaged in a tube, FIG. 7 is a diagrammatic cross-sectional view on the line 7—7 of FIG. 6;

DESCRIPTION OF THE PREFERRED EMBODIMENTS

Referring to FIGS. 1, 2, 3, 8 and 9 an insert embodying the invention is made by taking a U-shaped length of wire 10, to provide a core 11, and a helical coil 12 of desired material. In the present example the wire 10 is 1.5 mm diameter but the core 11 may be made of other material and may comprise two separate elements or more than two elements. In the present example the coil is made of mono-filament wire of 0.75 mm diameter. The elements of the core and/or the material of the coil may be mono-filament as in the example to be described or multi-filament and may be made of any suitable material including synthetic plastics material as well as metal or metal coated with synthetic plastics or other material so long as the relative strengths of the core elements and coil material is such as to permit the making of the insert as hereinafter described. In the case of multi filament material the filaments may be parallel or intertwined or otherwise arranged. The core elements may be of other configuration to the cylindrical configuration described hereinafter, for example, they may be of strip configuration. If desired the material of the coil may be of generally zig-zag configuration the zig-zags being arranged to lie in a surface extending parallel to the axis of the helical coil. Two, or more, coils may be trapped between the core elements if desired.

Figure 8:
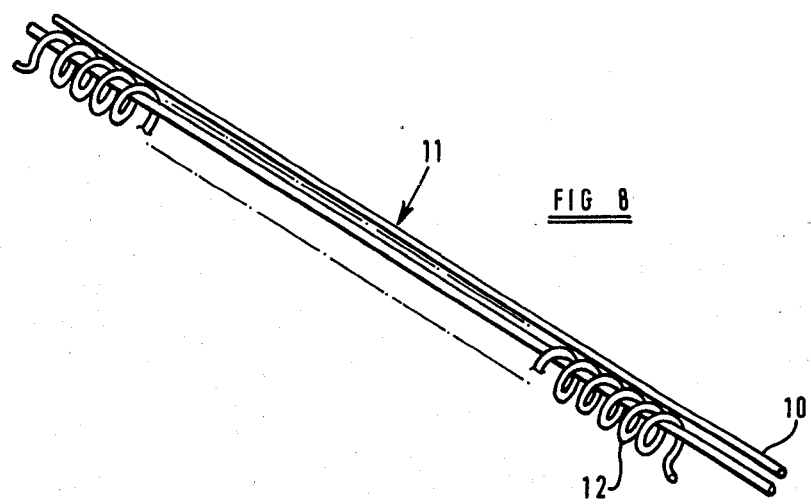
FIG. 8 is a perspective view showing a stage in the method of making the inserts of FIGS. 1 and 4.

The core elements are arranged to be of a length such that when they have been twisted together the desired number of times (and in the present example this is 50 twists per foot although other frequency of twisting may be utilised but generally will lie between 40 and 60 twists per foot) the elements, when twisted together, will have the desired overall length. The coil is then taken and it is arranged that a desired number of convolutions of the coil are present over the length of the elements and the elements are arranged so that one core element is disposed within and extending longitudinally of the coil as shown in FIG. 8. The coil may be formed with the convolutions at the desired spacing initially or the wire may be formed as a close, or closer, wound coil and stretched to the desired spacing.

The core elements are then twisted together the desired number of times in a suitable machine so that the convolutions of the coil are trapped between the twisted together core elements and caused to extend in a generally helical configuration about the core so that a median line 13 of each loop 14 thus formed extending from the core to a part of a respective loop 14 at the greatest distance from the core are disposed at different longitudinal positions along the core and different angular orientations around the core such that each line lies in a helical surface centered on the core. Preferably, not more than 8 loops are trapped between the core elements over the length of each helical pitch and still more preferably only about 5 loops are so trapped. This ensures that, looking in the direction of fluid flow, as one loop moves out of close proximity to the tube wall, the next helically adjacent loop moves into close proximity to the wall. However if desired a greater number of loops may be provided.

The number of twists per foot is arranged within the above described limits so that the convolutions of the coil are caused to lie in a surface which is or substantially parallel to a diametral plane of the core. If a lesser number of twists per foot are provided it is found that the convolutions of the coil lie in surfaces which are significantly inclined to a diametral plane of the core.

Because of the helical nature of the coils, each loop does not lie in a plane but in a surface, herein referred to as a loop surface, which is slightly non-planar.

In the Figures the convolutions of the loops are shown spaced apart for clarity of illustration. In practice the distance between adjacent convolutions where trapped is close and they can abut.

The diameter of the coil is arranged so that after the completion of the twisting operation the portions of the loops 14 thus formed which are most distant from the core will contact a conceptual cylindrical surface S1 centered on the core at points which describe a helical path. The conceptual cylindrical surface S1 will be hereinafter referred to as a first conceptual surface.

The diameter d1 of the surface S1 is related to the diameter of the tube in which the insert is to be placed, in use, so that, in the present example, the diameter of the conceptual surface is 40% greater than the internal diameter of the tube. The diameter of the first conceptual surface may be between 15% and 100% greater than that of the internal surface of the tube.

Figure 2:
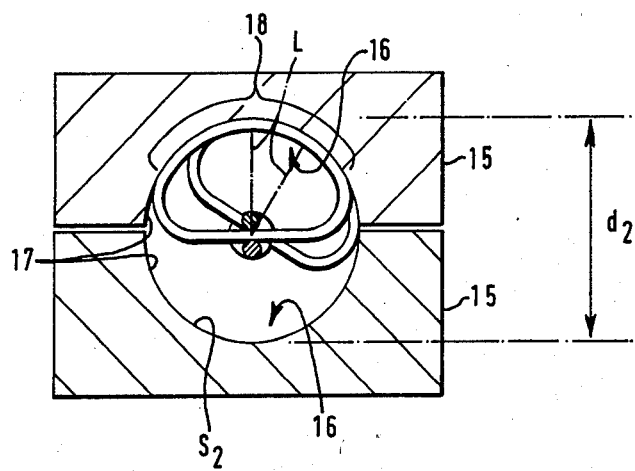
FIG. 2 is a diagrammatic view showing one stage in the method of making the insert shown in FIG. 1.

Referring now particularly to FIG. 2, the thus partly formed insert is then located between dies 15 having a recess 16 which together define a cylindrical cavity the surface 17 of which lies in a second conceptual cylindrical surface S2 of a diameter d2, greater than the internal diameter of the tube in which the insert is to be introduced. If desired the surface S2 may have a diameter lying in the range $+10\%$ and $-5\%$ of the internal diameter of the tube. Where the diameter is less than the diameter of the tube then although the loops will not contact the tube they can be caused to be contacted with it by means of a suitable bonding material.

Where the diameter is greater than that of the tube the inherent resilience of the loops permits them to be deformed as necessary as the insert is inserted into the tube so that, in use, the loops are resiliently biased into contact with the internal wall of the tube due to the inherent resilience of the loops. If desired, the loops may be bonded to the internal wall by means of a suitable bonding material.

Figure 3:
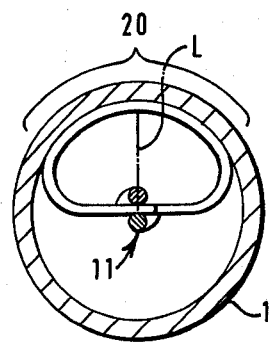
FIG. 3 is a transverse cross-sectional view showing part of the insert of FIG. 1 engaged in a tube.

By acting upon the loops with the dies 15 by bringing the dies 15 together the loops are deformed from the configuration they have when in contact with the first conceptual surface S1 i.e. generally circular, to a non-circular configuration shown in FIGS. 2 and 3 where they contact the second conceptual surface and as a result they can be seen to contact the second conceptual surface typically over 30% of the external perimeter of each loop as indicated at 18.

Thus when the insert is placed in a tube 19 the loops contact the internal surface of the tube over typically 30% of the external perimeter of the loop as indicated at 20 and hence are in close proximity to the contact surface over more than 30% of said perimeter.

Referring now to FIGS. 4 to 7 an alternative embodiment of the invention is illustrated. The first stages in the manufacture of this embodiment are as described above in connection with the first embodiment that is up to the completion of the stage shown in FIG. 9 where the loops are in contact with the first hereinbefore described conceptual surface S1.

The thus partly formed insert is then drawn through a drawing die 21 shown in FIG. 5b, the exit of which is of a diameter related to the internal diameter of the tube with which it is intended the insert is to be used in the same way as in the diameter of the surface 17 of the dies 15, hence the exit has a diameter d2 equal to or substantially equal to that of the surface S2. As the insert is drawn through the die 21 the loops are caused to be moved out of the generally diametral loop surfaces they occupy at the end of the stage shown in FIG. 9 to lie in loop surfaces which are inclined at an acute angle of less than 60° to the longitudinal axis of the core as shown in FIG. 5a which shows diagrammatically, by virtue of an exploded side elevation, how nine adjacent loops lie after drawing. In FIG. 5a, the loops are shown as separate loops for clarity; in fact the loops are interconnected by virtue of being adjacent turns of a helical coil. Also for clarity, in FIG. 5a, 18 loops are shown provided in each helical pitch, which is greater than the preferred figures of 5 to 8 loops. The loops, after leaving the die, lie in close proximity to a second conceptual cylindrical surface S2, of a diameter d2 related to the diameter of the tube with which the insert is to be used as described in connection with the first embodiment over 20% of the external periphery of the loops.

Thus when the insert is placed in a tube 22 as shown in FIGS. 6 and 7 the loops lie in close proximity to the internal surface of the tube over 20% of the external periphery of the loop as shown at 23.

As described in the first embodiment if the second conceptual surface S2 is of a diameter less than that of the tube, contact can be achieved by means of a bonding agent or if it is of greater diameter than the tube then inherent resilience of the loops permits insertion of the insert into the tube by decreasing the acute angle and the loops are again resiliently biased into contact with the surface due to a tendency for the loops to return to the acute angle at which they lie after drawing.

In both embodiments, the insert may be merely inserted into a tube or may be permanently secured within the tube by means of a suitable bonding agent such as by soldering or brazing or other bonding agent such as an adhesive or resin. It is preferred that the bonding agent has good heat conductivity.

In the examples described above the tube with which the insert is to be used is cylindrical. If desired the tube may be of other configuration. For example, it may be elliptical, in which case the insert would be deformed to the appropriate configuration by utilising dies similar to the dies 15 but with a surface of the desired configuration or by means of a drawing die similar to the die 21 but with a surface of the desired configuration.

Two series of tests were carried out.

In a first set of tests, an insert embodying the invention having loops inclined to the longitudinal axis of the core and being constructed in such a way as to incorporate 1067 loops per meter thus providing a relatively dense insert, was tested in a heat transfer situation in comparative tests with:

(1) a plain tube without any insert;
(2) a helical insert made of flat strip;
(3) an insert of the type described in GB PS No. 483642 where the number of loop portions was increased until the level of heat transfer achievable was maximised.

Figure 12:
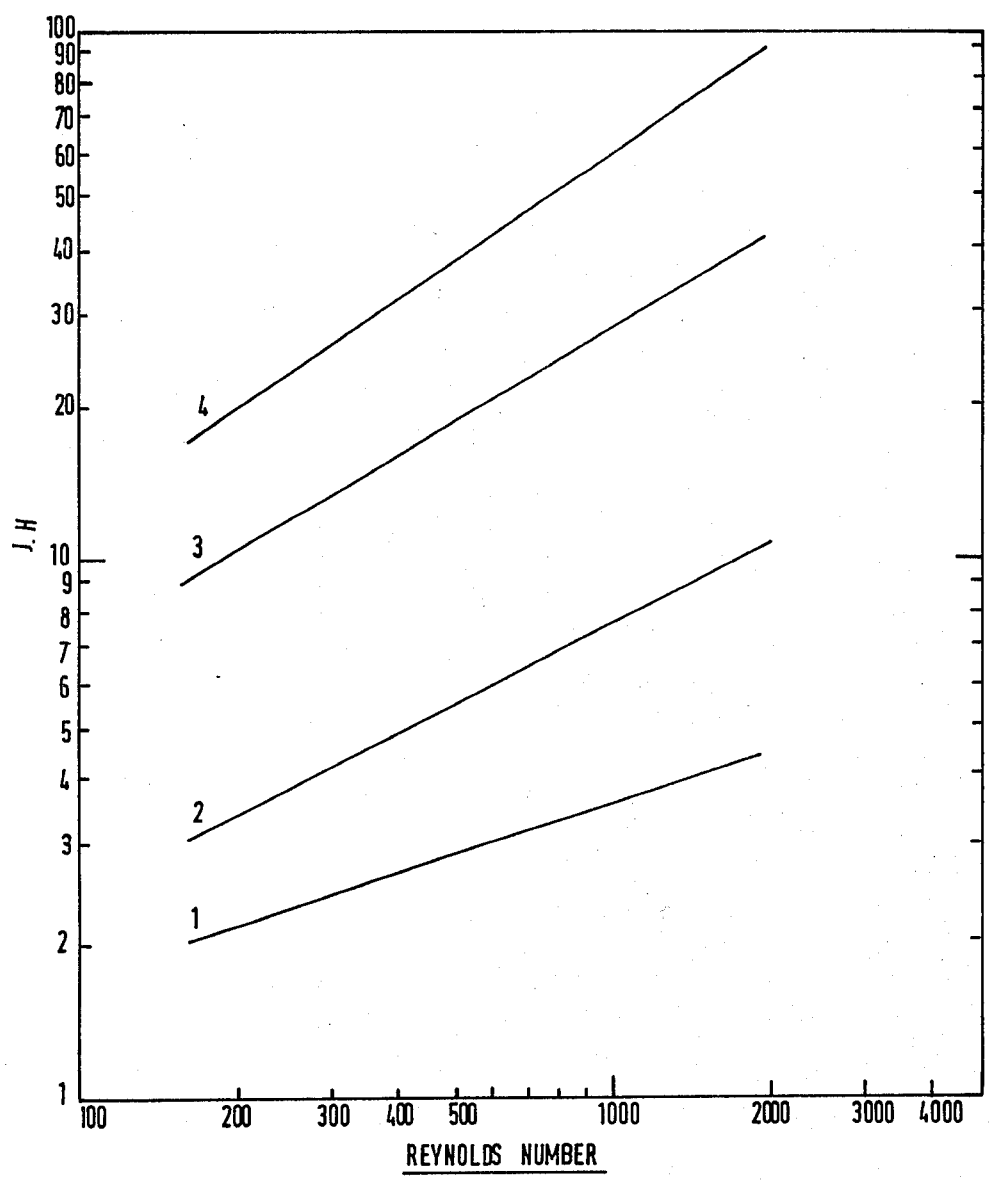
FIG. 12 shows 4 graphs of heat transfer factor plotted against Reynolds Number.

The results of the tests are represented by the four graphs in FIG. 12 where the numerals 1–3 refer to the comparison samples referred to above and the numeral 4 refers to the insert embodying the invention referred to above.

It will be seen that at a Reynolds Number of 500 the present invention attained a heat transfer performance (Jh37) substantially greater than the insert described in (3) above (Jh17) in fact an increase of greater than 110%. Further by comparison with a plain tube (Jh2.8) the increase is greater than thirteen times.

In a second set of tests; an insert referred to hereinafter by reference numeral (5) was constructed embodying the present invention incorporating just sufficient number of loops (410 per meter) in order to achieve a similar level of heat transfer to that obtained with the insert described above as insert (3) in the first set of tests.

Figure 13:
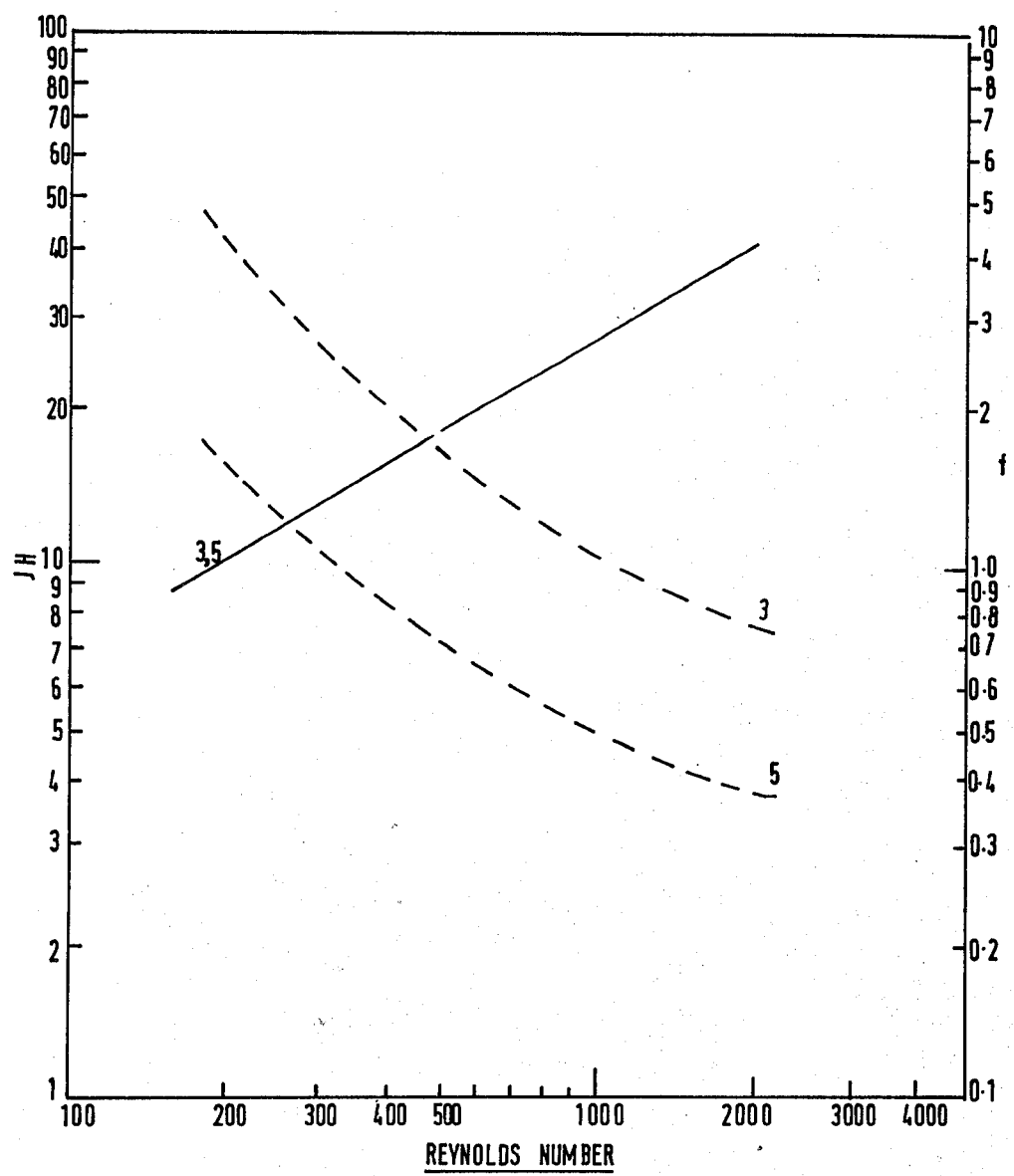
FIG. 13 shows a graph of heat transfer factor and two graphs of friction factor plotted against Reynolds Number.

The pressure loss incurred by both types of inserts was measured under similar fluid flow conditions and over a similar given length. The result of these tests are represented by the graphs of FIG. 13 in which the full line marked 3, 5 represents the heat transfer performance of samples 3 and 5 (and, incidentally, is the same line as the line marked 3 in FIG. 12) and the dashed line marked 3 represents the variation of friction factor with Reynolds Number in respect of sample 3 and the dashed line marked 5 represents the variation of friction factor with Reynolds Number in respect of sample 5. From FIG. 13 it will be seen that at, for example, a Reynolds Number of 500, the insert embodying the present invention, marked 5, had a friction factor of 0.72 whilst the insert 3 described above had a friction factor of 1.60. This shows a reduction in pressure loss of over 50%.

In FIGS. 12 and 13 Jh=heat transfer and f=friction factor (a dimensionless function of pressure loss).

In the case of a heat transfer application an insert according to the present invention can extend along the whole length of the or each heat exchanger tube or a plurality of inserts embodying the first invention may be arranged in end to end relationship along the length of the whole or part of the tube.

It has been found in the case of the embodiment where the loops lie in loop surfaces inclined at an acute angle to the longitudinal axis of the core that up to a 20% improvement in heat transfer is achieved if the direction of fluid flow is such that the part of each loop which is upstream in the general direction of fluid flow is that closest to the tube wall where fluid streams are presented with a convex baffle around and through which they must flow. In doing so the streams are caused to be generally divergent and as such will mix well with other streams. This would not be the case if the orientation of the insert was reversed and the fluid streams were presented with a concave baffle and this a convergent flow regime.

Figure 9:
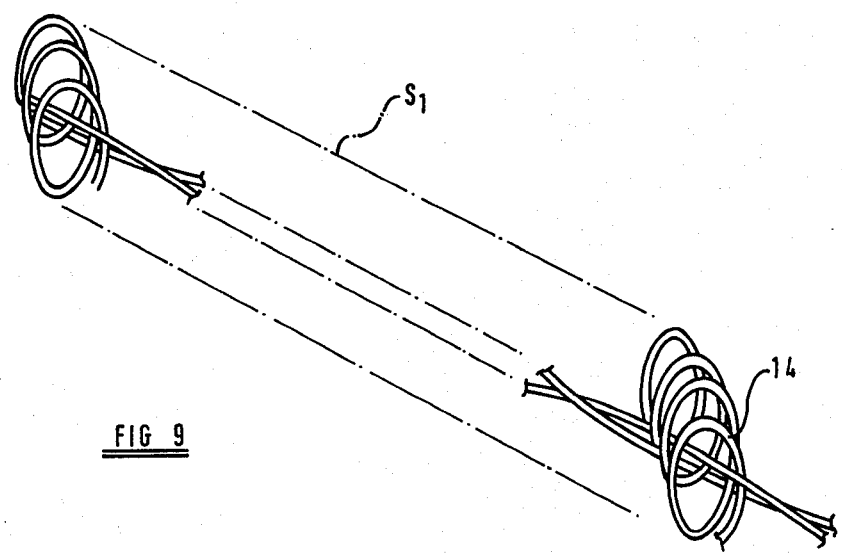
FIG. 9 is a perspective view to an enlarged scale showing another stage in the method of making the insert of FIGS. 1 and 4

It is to be noted that in both of the above described embodiments because the diameter d1 of the conceptual surface S1 which the insert contacts at the end of the stage shown in FIG. 9 is greater than the diameter of the tube into which the insert is to be placed and the loops are acted on to be caused to contact a second conceptual surface S2 of smaller diameter d2, a greater volume of loop material is present in close proximity to the wall and inserts compared with inserts known hitherto. In addition, they result in a larger surface area in contact with the fluid through which heat may be conducted where the inserts are bonded. At the same time because of the orientation of the loops to lie in loop surfaces which are substantially parallel to a diametral plane of the core, and hence of the tube, when the insert is in position in the case of the embodiment described with reference to FIGS. 1 to 3 and in loop surfaces which although inclined to the axis to the core and hence to the axis of the tube extend transverse to the axis of the core, and tube, in the case of the embodiment described with reference to FIGS. 4 to 6 a relatively clear passage for fluid is provided so that a lower pressure drop is achieved with inserts embodying the present invention. In particular, the loops of the present invention are not disposed in such a manner as to cause the fluid to flow in a spiral or helical path. In the present invention the fluid is directed to flow through the loops.

The deformed loop shape obtained by use of the dies 15 basically comprises a loop of generally semi-circular configuration connected to the core by generally radially extending and diametrically opposite limbs. Thus, in cross section, the insert comprises a plurality of radially extending elements which extend from the core to the wall of the tube and at the wall diametrically opposite pairs of these limbs are connected together by the circumferentially extending semi-circular portion.

If desired generally inwardly extending indentations could be provided on the semi-circular portion so as to produce a generally corrugated or sinusoidal shape thereby giving regions of relatively short contact at the walls and this configuration may be particularly valuable where the fluid has a very low Reynolds number.

The pitch to loop wire diameter may lie in the range 30:1 to 2:1.

Figure 10:
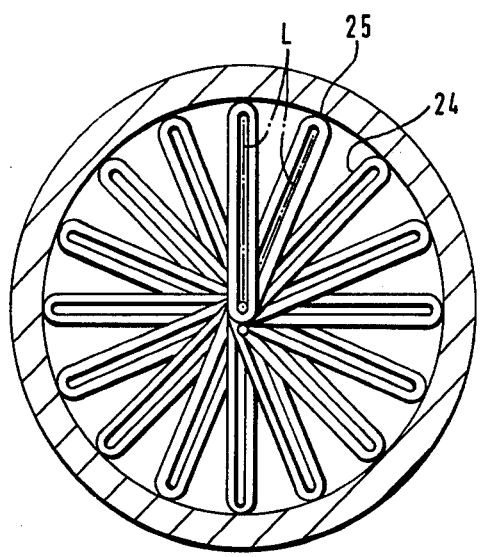
FIGS. 10 and 11 are diagrammatic cross sectional views of two further embodiments of the invention.

Although in the examples described hereinbefore the coil and hence the initial loop shape at the end of the stage shown in FIG. 9 is circular if desired the coil and hence initial loop shape may be other than circular for example the loops may be relatively elongate ellipses or ovals as shown in FIG. 10 at 24 and of the ratio of the minor axis to the major axis may lie in the range 1:1 to 6:1.

Figure 1:
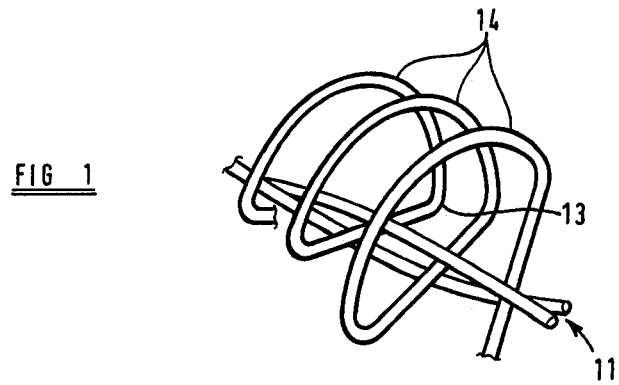
FIG. 1 is a perspective view of a part of an insert embodying the invention.

It is envisaged particularly where the ratio of the length of the major axis to that of the minor axis is relatively large the embodiment described with reference to FIGS. 4 to 7 would be used in that the relatively elongate loops would not be deformed as in the embodiment shown in FIG. 1 but would be caused to lie in inclined planes.

Both in the case of circular loops and non-circular loops the diameter of the loop, or length of the major axis as appropriate, may be larger than the radius of the second conceptual surface (or where that surface is non-circular the appropriate dimension at the relevant angular orientation to the core) by a factor lying in the range 1:2.

In cases where the loops are relatively elongate whilst having lesser length of wire in contact with the wall of the tube as shown at 25 in FIG. 9, than in the case of a initially circular loop will still have a greater length of contact than the point contact obtained hitherto and, in addition there would be relatively little pool hold up at the wall of the tube and this would be useful with fluids of very low Reynolds Number.

Particularly where the loops are relatively elongate the core may comprise a single element to which the loops are secured by bonding, such as soldering, or other means.

If desired, an insert embodying the present invention may comprise a combination of loops made from two or more coils. The coils may be of the same configuration or different configuration. For example, one coil 26 may be of circular configuration and the other of relatively elongate configuration 27 as described above to achieve an insert which, in end view, has the configuration shown in FIG. 11 after passing through a drawing die similar to that shown in FIG. 5 to ensure that the loops lie in loop surfaces inclined to the longitudinal axis.

Figure 11:
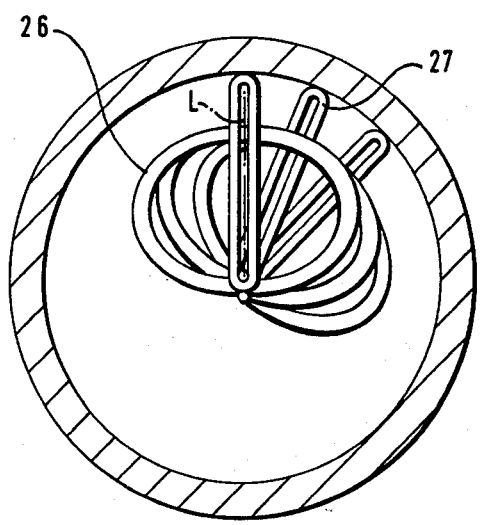

In a case where the insert comprises two or more sets of loops at least one of the sets of loops need not contact the walls of the tube as is the case with the initially circular loops 26 shown in FIG. 11. Alternatively, if desired, all loops could contact the wall of the tube.

Figure 14:
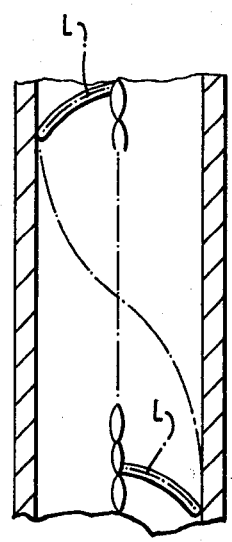
FIG. 14 is a diagrammatic cross-sectional view similar to that of FIG. 7 but of another embodiment of the invention.

Instead of the loops being caused to lie in a loop surface inclined at an acute angle to the longitudinal axis of the core, so that said laterally rectilinear line L is also longitudinally rectilinear and inclined to the core at an acute angle the loops may be caused to lie in a longitudinally curved loop surface in which lines normal to said laterally rectilinear line and intersecting opposite sides of the loop are rectilinear and said laterally rectilinear line L is longitudinally curved. Such an embodiment is illustrated in FIG. 14 and has similar performance characteristics to that shown in FIGS. 4 to 7.

Although the tubular portions described hereinbefore are cylindrical, if desired the tubular portion may be of other shape.

Inserts embodying the present invention are also advantageous in other than heat transfer applications for example in chemical reaction or other applications where it is desired to achieved good mixing of fluids with fluids or fluids with solids or to increase the rate of diffusion or permeation in tubes used for reverse osmosis and permeation or where it is desired to reduce fouling and deposition of solids on the walls of a vessel through which a fluid is flowing or mass transfer application.

For example, the embodiment having loops in which said laterally rectilinear line is inclined to the longitudinal axis has proved to be advantageous in situations where evaporating or condensing is taking place. The fluid may be influenced to flow to the wall of the tube with one vertical orientation of the insert or away from the wall by reversing the insert. This creates flow paths along which fluid may predictably be guided thus increasing or decreasing fluid film thickness at the wall. Heat transfer is substantially affected by film thickness.

For example, where the input fluid is directed downwardly and is a liquid to be evaporated by contact with a heated wall of a tube in which the insert is disposed to cause the liquid to be evaporated, the insert is arranged with the radially outermost parts of the loops downstream of the direction of input fluid flow so that the loops direct the liquid towards the wall to give evaporation at the wall and along path of each loop due to heat conductivity from the wall to the loops. Because a greater proportion of each loops circumference lies in close proximity to the wall then a greater extent of each loop is heated than has been achieved hitherto.

In another example, where the input fluid is again fed downwardly and is a vapour to be condensed by contact with a cooled wall of the tube in which the insert is disposed, the radially outermost part of each loop is disposed upstream of the direction of input fluid flow and as a result the loops direct the condensate liquid away from the wall so avoiding build up of liquid as a boundary layer at the wall.

In a further example, where the fluid is again a vapour to be condensed, the vapour is caused to flow upwardly but the insert is disposed as described in the second example above and again the loops cause condensate to be directed away from the wall so avoiding build up of a liquid boundary layer at the wall.

A further use of the invention is as a catalyst carrier by coating the insert with a material which is required to be in catalytic contact with a fluid passed through the vessel in which the insert is positioned.

A plurality of inserts of relatively short length, preferably a length to diameter ratio not greater than 2:1 may be arranged in a relatively large diameter column, for example 2 meters, for a mass transfer application such as liquid-liquid extraction or distillation.

Other applications of inserts embodying the invention are as follows:
 (a) Air-water or other systems where there is fouling from the water or one component in other systems,
 (b) In the heating and cooling of water with solids in suspension giving rise to a risk of fouling deposits,
 (c) In the heating of water or acquous mixture of low grade steam.

In such an application the invention has a much better (P/ft)/(T.P.) factor than hitherto because of better fluid distribution because of the wire configuration which provides more surface for impingement and co-alescence.

In addition the weight per unit volume of the insert is less than hitherto and so higher performance for lower cost can be achieved than hitherto.

We claim:

1. A method of making an insert for placement in a vessel to contact fluid therein comprising the steps of taking an insert comprising an elongate core having a plurality of loops disposed longitudinally therealong and angularly thereabout wherein a portion of each loop lies in close proximity to a first conceptual enveloping surface so that laterally rectilinear lines extending from the core to a mid point of the portion of a respective loop in close proximity to said first surface are disposed at different longitudinal positions along the core and at different angular orientations around the core, and acting on said loops to cause a portion thereof to lie in close proximity to a second conceptual enveloping surface of smaller cross-section than said first conceptual surface, prior to placement in said vessel, so that the portion in close proximity to said second conceptual surface is a greater proportion of the loop perimeter than that which was in close proximity to the first conceptual surface.

2. A method of making a tube or other vessel comprising an elongate tubular portion having positioned therein an insert to contact fluid therein comprising taking an insert comprising an elongate core having a plurality of loops disposed longitudinally therealong and angularly thereabout wherein a portion of each loop lies in close proximity to a first conceptual surface of a cross-sectional sectional configuration greater than that of said tubular portion so that laterally rectilinear lines extending from the core to the mid point of the portion of a respective loop in close proximity to said first surface are disposed at different longitudinal positions along the core and at different angular orientations around the core, and acting on said loops to cause a portion thereof to lie in close proximity to a second conceptual surface having a cross-sectional configuration substantially equal to that of the tubular portion, prior to positioning in said tubular portion, so that the portion in close proximity to said second conceptual surface is a greater proportion of the loop perimeter than that which was in close proximity to the first conceptual surface.

3. A method according to either one of the preceding claims wherein said loops are acted upon by being deformed from a first configuration which they have when said part is in close proximity to said first surface to a second configuration which they have when said part is in close proximity to said second surface.

4. A method according to claim 3 wherein the loops lie in the same loop surface after deformation as before deformation and said loop surface is substantially parallel to a diametral plane of the core.

5. A method according to claim 3 wherein the loops are deformed by acting upon the loops with a pair of reciprocable dies having a surface which, when the dies are closed, define said second conceptual surface.

6. A method according to either one of claims 1 or 2 wherein said loops are acted upon by being caused to be moved from lying in a loop surface which is substantially parallel to a diametral plane of the core when in close proximity to said first conceptual surface to lie in a loop surface inclined to the longitudinal axis of the core and with said laterally rectilinear line of each loop and the axis of the core lying in a plane containing the core and extending radially therefrom, when lying in close proximity to said second conceptual surface.

7. A method according to claim 6 wherein the shape of each loop is the same after being caused to lie in said inclined loop surface as before.

8. A method according to claim 6 wherein the loops are caused to lie in said inclined surfaces by passing the insert through a die the surface of which lies in said second conceptual surface.

9. A method according to either one of claims 1 or 2 wherein said loops are acted upon by being caused to move from lying in a loop surface which is substantially parallel to a diametral plane of the core when in close proximity to said first conceptual surface to lie in a curved loop surface with said laterally rectilinear line of each loop being longitudinally curved and lines intersecting said line at right angles and passing through the sides of the loop being rectilinear and with said laterally rectilinear line of each loop and the axis of the core lying in a plane containing the core and extending radially therefrom, when lying in close proximity to said second conceptual surface.

10. A method according to either one of claims 1 or 2 wherein the core comprises at least two elongate elements, the method comprising positioning a first core element within and extending through convolutions of a helical coil of filamentary material, positioning the second core element outside the helical coil, and then twisting the core elements together so that turns of the helical coil are caused to extend in a generally helical configuration about the core.

11. A method according to claim 10 wherein the core elements are twisted together to provide sufficient turns to ensure that the loops lie substantially parallel to a diametrical plane of the core.

12. An insert for placement in a vessel to contact fluid therein comprising an elongate core having a plurality of loops of filamentary material disposed longitudinally therealong and angularly thereabout wherein a portion of each loop has been acted on to be moved from a first conceptual enveloping surface to a second conceptual enveloping surface of smaller cross section than said first conceptual surface, prior to placement in said vessel, so that laterally rectilinear lines extending from the core to a mid point of the portion of a respective loop in close proximity to said second conceptual surface are disposed at different longitudinal positions along the core and different angular orientations around the core, and wherein each line of each loop lies in a loop surface inclined to the longitudinal axis of the core at an acute angle when said line is longitudinally rectilinear or said line being longitudinally curved and said line of the loop and said axis of the core lying in a plane containing the core and extending radially therefrom.

13. A method of making an insert for placement in a vessel to contact fluid therein comprising the steps of taking an insert comprising an elongated core having a plurality of loops disposed longitudinally therealong and angularly thereabout, each loop comprising at least one turn of a helical coil and the core comprising at least two elongate elements twisted together and a part of each of said loops being held between the twisted together elements, wherein a portion of each loop lies in close proximity to a first conceptual enveloping surface so that laterally rectilinear lines extending from the core to a mid point of the portion of a respective loop in close proximity to said first surface are disposed at different longitudinal positions along the core and at different angular orientations around the core, and acting on said loops to cause a portion thereof to lie in close proximity to a second conceptual enveloping surface of smaller cross section than said first conceptual surface, prior to placement in said vessel, so that the portion in close proximity to said second conceptual surface is a greater proportion of the loop perimeter than that which was in close proximity to the first conceptual surface.

14. A method of making a tube or other vessel comprising an elongate tubular portion having positioned therein an insert to contact fluid therein comprising taking an insert comprising an elongate core having a plurality of loops disposed longitudinally therealong and angularly thereabout, each loop comprising at least one turn of a helical coil and the core comprising at least two elongate elements twisted together and a part of each of said loops being held between the twisted together elements, wherein a portion of each loop lies in close proximity to a first conceptual surface of a cross-sectional configuration greater than that of said tubular portion so that laterally rectilinear lines extending from the core to the mid point of the portion of a respective loop in close proximity to said first surface are disposed at different longitudinal positions along the core and at different angular orientations around the core, and acting on said loops to cause a portion thereof to lie in close proximity to a second conceptual surface having a cross-sectional configuration substantially equal to that of the tubular portion, prior to positioning in said tubular portion, so that the portion in close proximity to said second conceptual surface is a greater proportion of the loop perimeter than that which was in close proximity to the first conceptual surface.

15. An insert for placement in a vessel to contact fluid therein comprising an elongate core having a plurality of loops of filamentary material disposed longitudinally therealong and angularly thereabout, each loop comprising at least one turn of a helical coil and the core comprising at least two elongate elements twisted together and a part of each of said loops being held between the twisted together elements, wherein a portion of each loop has been acted on to be moved from a first conceptual enveloping surface to a second conceptual enveloping surface of smaller cross section than said first conceptual surface, prior to placement in said vessel, so that laterally rectilinear lines extending from the core to a mid point of the portion of a respective loop in close proximity to said second conceptual surface are disposed at different longitudinal positions along the core and different angular orientations around the core, and wherein each line of each loop lies in a loop surface inclined to the longitudinal axis of the core at an acute angle when said line is longitudinally rectilinear or said line being longitudinally curved and said line of the loop and said axis of the core lying in a plane containing the core and extending radially therefrom.

* * * * *